March 23, 1954    J. M. MacLEAN    2,672,906
RESILIENT VEHICLE WHEEL
Filed Oct. 13, 1951

Inventor
JAMES M. MacLEAN
by: Fetherstonhaugh & Co.
Att'ys.

Patented Mar. 23, 1954

2,672,906

UNITED STATES PATENT OFFICE 2,672,906

RESILIENT VEHICLE WHEEL

James Matthew MacLean, Windsor, Ontario, Canada, assignor to Enjar Wheels, Limited, Windsor, Ontario, Canada, a corporation of Ontario Application October 13, 1951, Serial No. 251,160

9 Claims. (Cl. 152—41)

This invention relates to a resilient vehicle wheel construction of a type particularly adaptable for military and agricultural vehicles.

There have been very many attempts in the past to construct a wheel having a substantially solid tire member which could be suitable for military and agricultural vehicles. In avoiding the use of the pneumatic tire difficulties have arisen in providing a resilient or yieldable connection between the tire rim and the hub of the wheel. Various designs have been proposed for the resilient connection in this area or web part of the wheel and are in general characterized by conditions of undue flexibility accompanied by tension in the yieldable members, insufficient yieldability such as is encountered in the compression bumper type of design, and also lack of stability under side thrust conditions.

Only very few of the many designs of resilient solid tire wheel have been tried even experimentally and those which may have approached requirements of serviceability have been impractical due to the complexity of the components.

It is the particular object of the present invention to provide a resilient substantially solid tire wheel for military and agricultural use which incorporates sufficient yieldability in the structure of the web part and yet substantially avoids extreme tensions developing in the particular yielding member employed as hereinafter disclosed in more detail.

Another object of the invention is to provide a resilient wheel characterized by a floating web part to which the rim of the wheel is resiliently connected and to which the hub of the wheel is independently resiliently connected.

Other objects of the invention will be appreciated by a study of the following specification taken in conjunction with the accompanying drawings.

Figure 1:
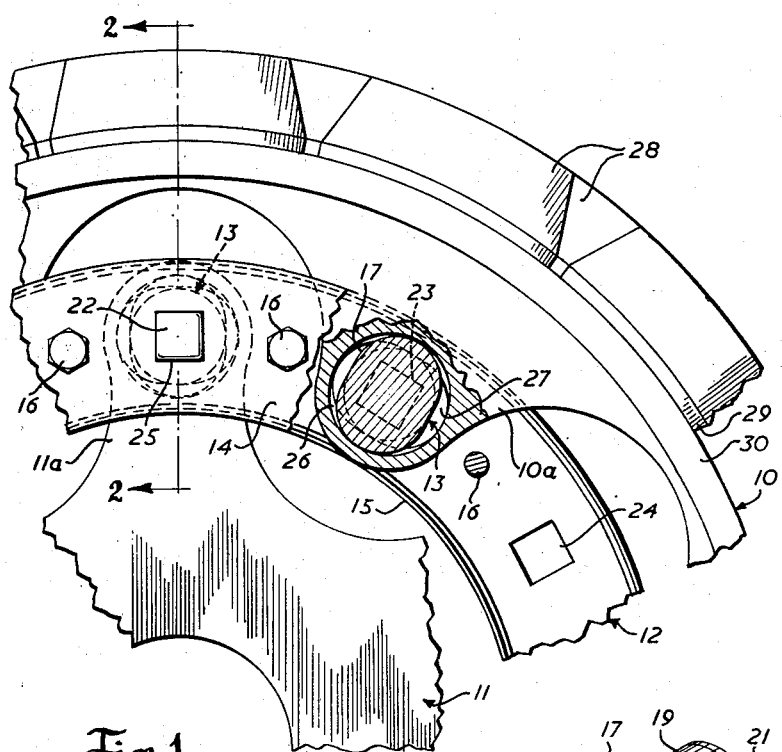
Figure 1 shows a quarter portion of a wheel according to the invention with the remainder of the wheel cut away and disclosing in a cutaway view a detail of the resilient connection to the floating web part.
Figure 3:
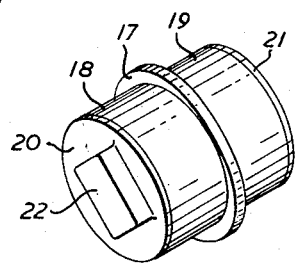
Figure 3 is a perspective view of the preferred form of resilient inter-connecting block of Figures 1 and 2.

Referring in more detail to the drawings, it should be observed that the wheel of the invention is comprised of three main components, namely, a rim member 10, a hub member 11, and a floating web member 12, all of which are inter-connected by resilient inter-connecting blocks 13.

In the preferred construction shown, the floating web member 12 is in the form of spaced apart annular channel parts 14 and 15 which, at predetermined spacings, are drawn together to a predetermined spaced apart relationship by suitable bolts 16 or other device. The resilient inter-connecting member 13 has a central locking flange 17 to the faces of which are bonded cylinders 18 and 19 of a resilient material such as a fifty-nine durometer rubber composition. The free ends of these cylinders are bonded to locking plates 20 and 21 having thereon locking studs 22 and 23 of non-circular form adapted to lock within non-circular sockets or recesses 24 and 25 of the floating web parts 14 and 15.

As will be observed upon examination of Figure 1, support members 10a and 11a extend in alternate arrangement from the hub and rim toward the floating web 12 to lie within the channel parts of the latter and to present a locking socket 26 disposed preferably on a common diameter, the latter being the mean diameter of the floating web.

The wheel of the invention is assembled by inserting the resilient inter-connecting blocks through the non-circular openings 27 until the locking rim 17 thereof is aligned with the locking recesses, at which point the inter-connecting member is rotated to provide engagement of the rim part in the sockets 26. When the rim part is properly aligned in the sockets 26, the non-circular locking members on the ends of the locking plates 20 are aligned for acceptance into the non-circular locking sockets or recesses 24 and 25 of the annular channel members of the floating web.

It should be particularly appreciated that as the bolts 16 are tightened, the resilient material of the cylinders 18 and 19 is subjected to a certain degree of precompression and it is the degree of precompression attained which I may rely upon to substantially obviate tension and shear stresses in the resilient material during distortion in the action of the wheel. It will, of course, be appreciated that during wheel assembly, as the resilient inter-connecting members are placed into the support members, the latter are disposed in their intended relationship to accommodate assembly of the floating web component.

Figure 2:
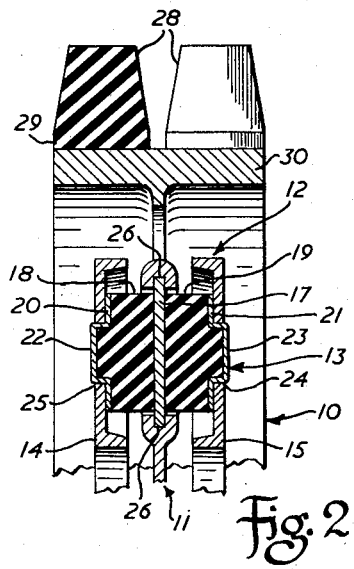
Figure 2 is a sectional view on the line 2—2 of Figure 1.
Figure 4:
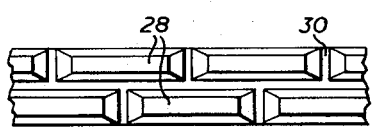
Figure 4 is a face view of a portion of the preferred form of tire illustrated in Figure 1.

A tire member suitable for the present form of wheel is illustrated in Figures 1, 2 and 4, and preferably comprises a plurality of block-like forms 28 disposed in staggered relationship along the rim. Each of these blocks may be orificed near the base 29 or may be formed of a combination of a core of a cellular resilient material such as one of the many types of foam rubber surrounded by a continuous layer or layers of rubber or other suitable yieldable material. These blocks may be fastened to the rim by first bonding the material of the blocks to some fastening means such as a brass plate (not shown) carrying bolts fastenable through the metal rim part 30.

It is intended that the present disclosure should not be construed in any limiting sense other than that indicated by the scope of the following claims.

What I claim as my invention is:

1. A resilient wheel adaptable for military and agricultural use, comprising in combination: a hub part, a separate rim part, and a floating web part in the form of structurally joined spaced apart annular members, supporting means on said hub part and rim part, extending respectively in alternate relationship radially between said annular members but spaced from one another and said annular members, and a resilient member for each of said supporting members extending from each supporting member to said annular members.

2. A wheel as claimed in claim 1, wherein the resilient member is in the form of a non-circular locking flange having resilient bodies projecting therefrom in two directions substantially at right angles to the axis of the flange, a non-circular opening in each supporting member adapted for free passage of said flange in one position of the latter, and a substantially circular locking recess in the region of said opening formed on a diameter substantially corresponding to the maximum dimension of said opening and adapted to receive said flange for locking engagement therewith.

3. A wheel as claimed in claim 1, wherein the resilient member is in the form of a non-circular locking flange having resilient bodies projecting therefrom in two directions substantially at right angles to the axis of the flange, a non-circular opening in each supporting member adapted for free passage of said flange in one position of the latter, a substantially circular locking recess in the region of said opening formed on a diameter substantially corresponding to the maximum dimension of said opening and adapted to receive said flange for locking engagement therewith, and means on said floating web adapted to connect with the free end of the resilient members to restrain the latter from rotation on assembly therewith.

4. A wheel as claimed in claim 1, wherein the resilient member is in the form of a non-circular locking flange having resilient bodies projecting therefrom in two directions substantially at right angles to the axis of the flange, a non-circular opening in each supporting member adapted for free passage of said flange in one position of the latter, a substantially circular locking recess in the region of said opening formed on a diameter substantially corresponding to the maximum dimension of said opening and adapted to receive said flange for locking engagement therewith, said web part being in the form of two annular components mountable to engage the free ends of the resilient members, and means for drawing said annular components toward one another on assembly of the wheel to effect some degree of precompression in the material of the resilient members.

5. A resilient wheel comprising, in combination, a hub assembly provided with circumferentially spaced outwardly radially projecting stub supports, a separate rim assembly provided with circumferentially spaced inwardly radially projecting stub supports, said hub and rim so relatively disposed that their respective stub supports are arranged alternately and in spaced relationship, a floating annular web assembly disposed intermediate the hub and the rim and projecting stub supports thereof, said web assembly including a pair of opposed complementary annular web members disposed on opposite sides of the stub supports, and resilient load carrying means connecting each stub support with both opposed annular web members and constituting the load transmitting connection between the rim assembly and the hub assembly.

6. A resilient wheel comprising, in combination, a hub assembly provided with circumferentially spaced outwardly radially projecting stub supports, a separate rim assembly provided with circumferentially spaced inwardly radially projecting stub supports, said hub and rim so relatively disposed that their respective stub supports are arranged alternately and in spaced relationship, a floating annular web assembly disposed intermediate the hub and the rim and projecting stub supports thereof, said web assembly including a pair of opposed complementary annular web members disposed on opposite sides of the stub supports, and resilient load carrying means connecting each stub support with the pair of opposed complementary annular web members, and means holding said opposed web members toward the stub supports maintaining the resilient load carrying means under compression therebetween.

7. A resilient wheel for a vehicle as defined in claim 6, characterized in that the resilient means which connects each stub support with the annular web members, is provided on opposite ends with projecting bosses which bosses are engaged within apertures provided in the two complementary web members.

8. A resilient wheel for a vehicle as defined in claim 6, characterized in that the two opposed complementary web members are held toward each other by connecting devices compressing said resilient means therebetween whereby the distortion of said resilient means due to the load stresses transmitted between the rim and the hub are taken substantially within the limits of the normal compression of said resilient means by the web members.

9. A resilient wheel as defined in claim 5, characterized in that connecting means extend between two annular web members tensioning them toward each other and against the resilient load carrying means, and said connecting means is disposed spaced from and between said load carrying means.

JAMES MATTHEW MacLEAN.

References Cited in the file of this patent

UNITED STATES PATENTS

| Number | Name | Date |
| --- | --- | --- |
| 519,807 | Cloud | May 15, 1894 |
| 2,528,156 | Maiorca | Oct. 31, 1950 |